United States Patent
Kent et al.

(10) Patent No.: US 8,086,242 B2
(45) Date of Patent: *Dec. 27, 2011

(54) METHOD AND SYSTEM FOR ADAPTIVE ALLOCATION OF FEEDBACK RESOURCES FOR CQI AND TRANSMIT PRE-CODING

(75) Inventors: Mark Kent, Vista, CA (US); Vinko Erceg, Cardiff, CA (US); Jun Zheng, San Diego, CA (US); Sirikiat Ariyavisitakul, Alpharetta, GA (US)

(73) Assignee: Broadcom Corporation, Irvine, CA (US)

( * ) Notice: Subject to any disclaimer, the term of this patent is extended or adjusted under 35 U.S.C. 154(b) by 1021 days.

This patent is subject to a terminal disclaimer.

(21) Appl. No.: 11/864,638

(22) Filed: Sep. 28, 2007

(65) Prior Publication Data
US 2008/0233965 A1    Sep. 25, 2008

Related U.S. Application Data

(60) Provisional application No. 60/896,121, filed on Mar. 21, 2007.

(51) Int. Cl.
*H04W 72/00* (2009.01)
(52) U.S. Cl. .................. 455/452.2; 370/310.2
(58) Field of Classification Search .......... None
See application file for complete search history.

(56) References Cited

U.S. PATENT DOCUMENTS

2006/0270360 A1*  11/2006  Han et al. ................. 455/69
2010/0097949 A1*   4/2010  Ko et al. ................. 370/252

FOREIGN PATENT DOCUMENTS

KR    10-2003-0092894    12/2003
KR    10-2006-124088     12/2006

* cited by examiner

*Primary Examiner* — Steven H Nguyen
*Assistant Examiner* — Kouroush Mohebbi
(74) *Attorney, Agent, or Firm* — McAndrews, Held & Malloy, Ltd.

(57) ABSTRACT

Aspects of a method and system for adaptive allocation of feedback resources for CQI and transmit pre-coding may include assigning a bandwidth and a feedback period to one or more CQI reporting units and a bandwidth and a feedback period to one or more PMI reporting units. One or more feedback messages may be generated based at least on channel state information associated with the bandwidth and the feedback period assigned to the one or more CQI reporting units and with the bandwidth and the feedback period assigned to the one or more PMI reporting units. The bandwidth and the feedback period of the CQI reporting units and/or the PMI reporting units may be adjusted dynamically and/or adaptively. Based on the channel state information or as a function of a feedback rate, the bandwidth and/or the feedback period may be assigned.

24 Claims, 6 Drawing Sheets

METHOD AND SYSTEM FOR ADAPTIVE ALLOCATION OF FEEDBACK RESOURCES FOR CQI AND TRANSMIT PRE-CODING

CROSS-REFERENCE TO RELATED APPLICATIONS/INCORPORATION BY REFERENCE

This application makes reference to, claims priority to, and claims the benefit of U.S. Provisional Application Ser. No. 60/896,121, filed on Mar. 21, 2007.

FIELD OF THE INVENTION

Certain embodiments of the invention relate to signal processing for communication systems. More specifically, certain embodiments of the invention relate to a method and system for adaptive allocation of feedback resources for CQI and transmit pre-coding.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers.

In order to meet these demands, communication systems using multiple antennas at both the transmitter and the receiver have recently received increased attention due to their promise of providing significant capacity increase in a wireless fading environment. These multi-antenna configurations, also known as smart antenna techniques, may be utilized to mitigate the negative effects of multipath and/or signal interference on signal reception. It is anticipated that smart antenna techniques may be increasingly utilized both in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and to raise the degrees of freedom to suppress interference generated within the signal reception process. Diversity gains improve system performance by increasing received signal-to-noise ratio and stabilizing the transmission link. On the other hand, more degrees of freedom allow multiple simultaneous transmissions by providing more robustness against signal interference, and/or by permitting greater frequency reuse for higher capacity. In communication systems that incorporate multiantenna receivers, a set of M receive antennas may be utilized to null the effect of (M−1) interferers, for example. Accordingly, N signals may be simultaneously transmitted in the same bandwidth using N transmit antennas, with the transmitted signal then being separated into N respective signals by way of a set of N antennas deployed at the receiver. Systems that utilize multiple transmit and receive antennas may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power and bandwidth, the capacity offered by a MIMO configuration may scale with the increased signal-to-noise ratio (SNR). For example, in the case of fading multipath channels, a MIMO configuration may increase system capacity by nearly M additional bits/cycle for each 3-dB increase in SNR.

The widespread deployment of multi-antenna systems in wireless communications has been limited by the increased cost that results from increased size, complexity, and power consumption. As a result, some work on multiple antenna systems may be focused on systems that support single user point-to-point links, other work may focus on multiuser scenarios. Communication systems that employ multiple antennas may greatly improve the system capacity. To obtain significant performance gains using MIMO technology, it may however be desirable to supply information on the channel to the transmitter. Such channel data is called channel state information (CSI). In many wireless systems, the uplink and the downlink operate in frequency division duplex (FDD) mode, that is, the uplink and the downlink use different frequencies. When this is the case, channel measurements of the uplink may not be applicable to the downlink and vice versa. In these instances, the channel may be measured only by a signal receiver and channel state information may be fed back to the transmitter.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for adaptive allocation of feedback resources for CQI and transmit pre-coding, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for adaptive allocation of feedback resources for CQI and transmit pre-coding. Aspects of the method and system for adaptive allocation of feedback resources for CQI and transmit pre-coding may comprise assigning a bandwidth and a feedback period to one or more CQI reporting units and a bandwidth and a feedback period to one or more PMI reporting units. One or more feedback messages may be generated based at least on channel state information associated with the bandwidth and the feedback period assigned to the one or more CQI reporting units and with the bandwidth and the feedback period assigned to the one or more PMI reporting units.

The bandwidth and the feedback period of the CQI reporting units and/or the PMI reporting units may be adjusted dynamically and/or adaptively. Based on the channel state information or as a function of a feedback rate, the bandwidth and/or the feedback period may be assigned. The associated channel state information may comprise channel measurements that may be associated with the assigned bandwidth and the assigned feedback period. Processing the channel state information may be achieved by averaging the channel measurements or by an arbitrary function of the channel measurements. The one or more feedback messages for the one or more CQI reporting units may comprise modulation and coding levels or Signal-Noise-and-Interference ratios. The one or more feedback messages for the one or more PMI reporting units may comprise one or more indices into a codebook or one or more matrices.

Figure 1A:
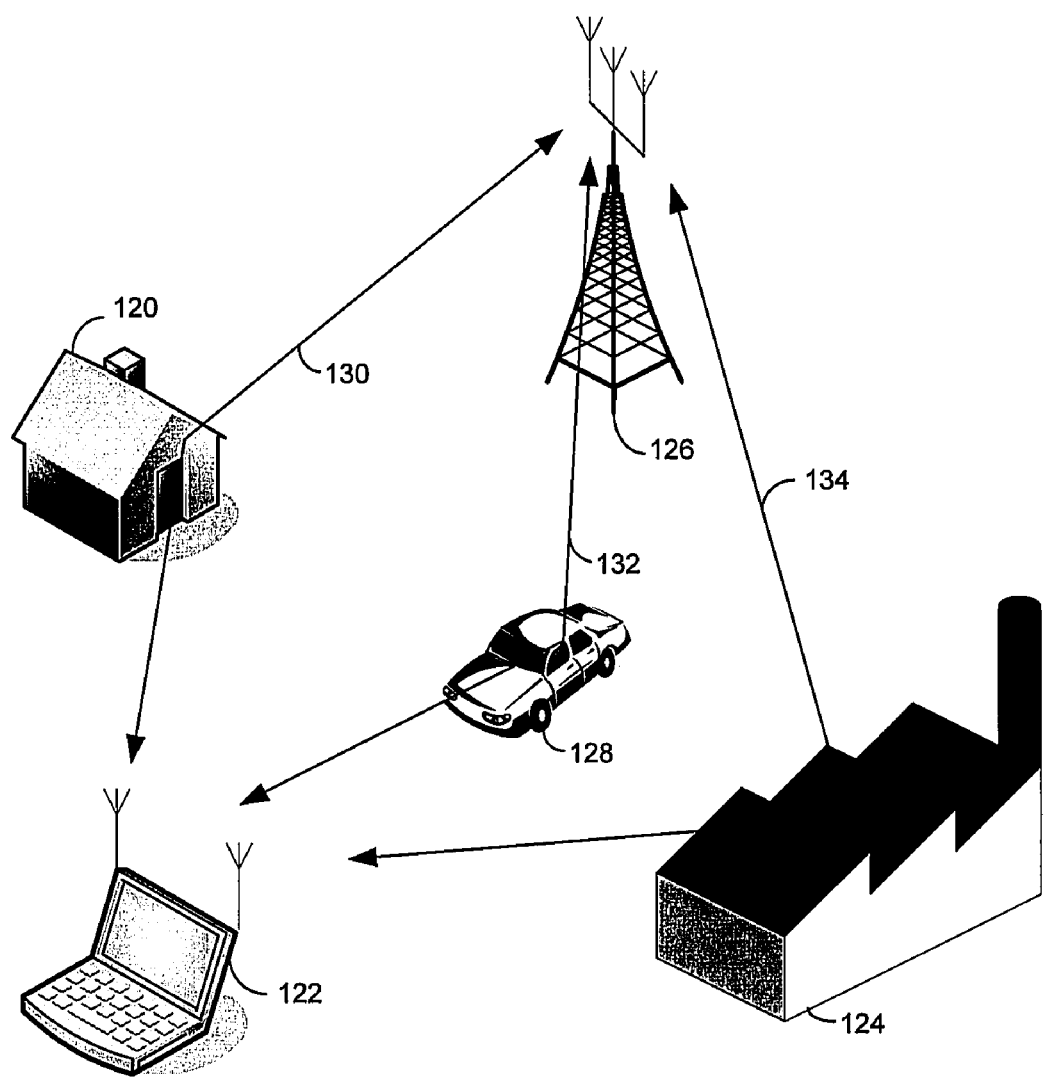
FIG. 1A is a diagram illustrating exemplary cellular multipath communication between a base station and a mobile computing terminal, in connection with an embodiment of the invention.

FIG. 1A is a diagram illustrating exemplary cellular multipath communication between a base station and a mobile computing terminal, in connection with an embodiment of the invention. Referring to FIG. 1A, there is shown a house 120, a mobile terminal 122, a factory 124, a base station 126, a car 128, and communication paths 130, 132 and 134.

The base station 126 and the mobile terminal 122 may comprise suitable logic, circuitry and/or code that may be enabled to generate and process MIMO communication signals.

Wireless communications between the base station 126 and the mobile terminal 122 may take place over a wireless channel. The wireless channel may comprise a plurality of communication paths, for example, the communication paths 130, 132 and 134. The wireless channel may change dynamically as the mobile terminal 122 and/or the car 128 moves. In some cases, the mobile terminal 122 may be in line-of-sight (LOS) of the base station 126. In other instances, there may not be a direct line-of-sight between the mobile terminal 122 and the base station 126 and the radio signals may travel as reflected communication paths between the communicating entities, as illustrated by the exemplary communication paths 130, 132 and 134. The radio signals may be reflected by man-made structures like the house 120, the factory 124 or the car 128, or by natural obstacles like hills. Such a system may be referred to as a non-line-of-sight (NLOS) communications system.

A communication system may comprise both LOS and NLOS signal components. If a LOS signal component is present, it may be much stronger than NLOS signal components. In some communication systems, the NLOS signal components may create interference and reduce the receiver performance. This may be referred to as multipath interference. The communication paths 130, 132 and 134, for example, may arrive with different delays at the mobile terminal 122. The communication paths 130, 132 and 134 may also be differently attenuated. In the downlink, for example, the received signal at the mobile terminal 122 may be the sum of differently attenuated communication paths 130, 132 and/or 134 that may not be synchronized and that may dynamically change. Such a channel may be referred to as a fading multipath channel. A fading multipath channel may introduce interference but it may also introduce diversity and degrees of freedom into the wireless channel. Communication systems with multiple antennas at the base station and/or at the mobile terminal, for example MIMO systems, may be particularly suited to exploit the characteristics of wireless channels and may extract large performance gains from a fading multipath channel that may result in significantly increased performance with respect to a communication system with a single antenna at the base station 126 and at the mobile terminal 122, in particular for NLOS communication systems.

Figure 1B:
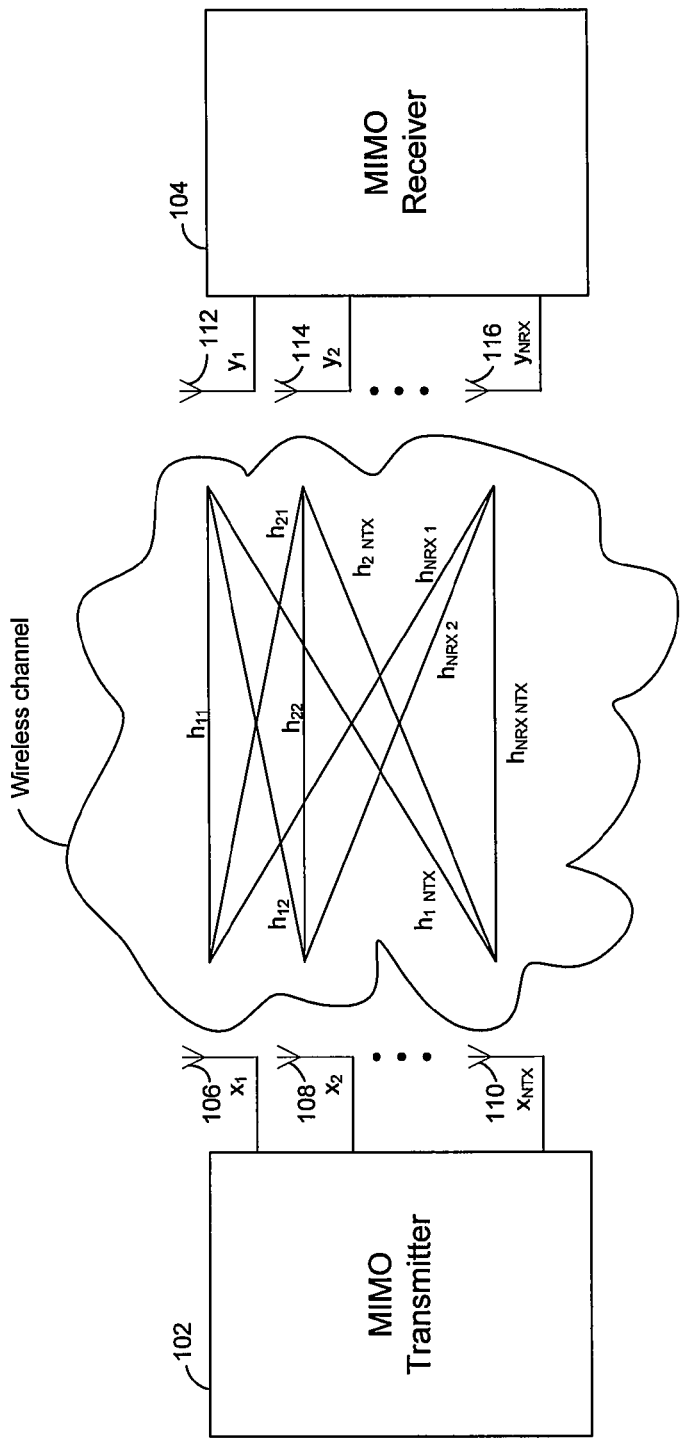
FIG. 1B is a diagram illustrating an exemplary MIMO communication system, in accordance with an embodiment of the invention.

FIG. 1B is a diagram illustrating an exemplary MIMO communication system, in accordance with an embodiment of the invention. Referring to FIG. 1B, there is shown a MIMO transmitter 102 and a MIMO receiver 104, and antennas 106, 108, 110, 112, 114 and 116. There is also shown a wireless channel comprising communication paths $h_{11}$, $h_{12}$, $h_{22}$, $h_{21}$, $h_{2\ NTX}$, $h_{1\ NTX}$, $h_{NRX\ 1}$, $h_{NRX\ 2}$, $h_{NRX\ NTX}$, where $h_{mn}$ may represent a channel coefficient from transmit antenna n to receiver antenna m. There may be $N_{TX}$ transmitter antennas and $N_{RX}$ receiver antennas. There is also shown transmit symbols $x_1$, $x_2$ and $x_{NTX}$, and receive symbols $y_1$, $y_2$ and $y_{NRX}$.

The MIMO transmitter 102 may comprise suitable logic, circuitry and/or code that may be enabled to generate transmit symbols $x_i$ $i \in \{1, 2, \ldots N_{TX}\}$ that may be transmitted by the transmit antennas, of which the antennas 106, 108 and 110 may be depicted in FIG. 1B. The MIMO receiver 104 may comprise suitable logic, circuitry and/or code that may be enabled to process the receive symbols $y_i$ $i \in \{1, 2, \ldots N_{RX}\}$ that may be received by the receive antennas, of which the antennas 112, 114 and 116 may be shown in FIG. 1B. An input-output relationship between the transmitted and the received signal in a MIMO system may be written as:

$$y = Hx + n$$

where $y = [y_1, y_2, \ldots y_{NRX}]^T$ may be a column vector with $N_{RX}$ elements, $^T$ may denote a vector transpose, $H = [h_{ij}]$: $i \in \{1, 2, \ldots N_{RX}\}$; $j \in \{1, 2, \ldots N_{TX}\}$ may be a channel matrix of dimensions $N_{RX}$ by $N_{TX}$, $x = [x_1, x_2, \ldots x_{NTX}]^T$ is a column vector with $N_{TX}$ elements and n is a column vector of noise samples with $N_{RX}$ elements. The channel matrix H may be written, for example, as $H = U \Sigma V^H$ using the Singular Value Decomposition (SVD), where $\cdot^H$ denotes the Hermitian transpose, U is a $N_{RX}$ by $N_{TX}$ unitary matrix, $\Sigma$ is a $N_{TX}$ by $N_{TX}$ diagonal matrix and V is $N_{TX}$ by $N_{TX}$ unitary matrix. Other matrix decompositions that may diagonalize or transform the matrix H may be used instead of the SVD. If the receiver algorithm implemented in MIMO receiver 104 is, for example, an Ordered Successive Interference Cancellation (OSIC), other matrix decompositions that convert the matrix H to lower/upper triangular may be appropriate. One such decomposition may comprise Geometric Mean Decomposition (GMD), where $H=QRP^H$, where R may be upper triangular with the geometric mean of the singular values of H on the diagonal elements, and Q and P may be unitary.

Figure 2:
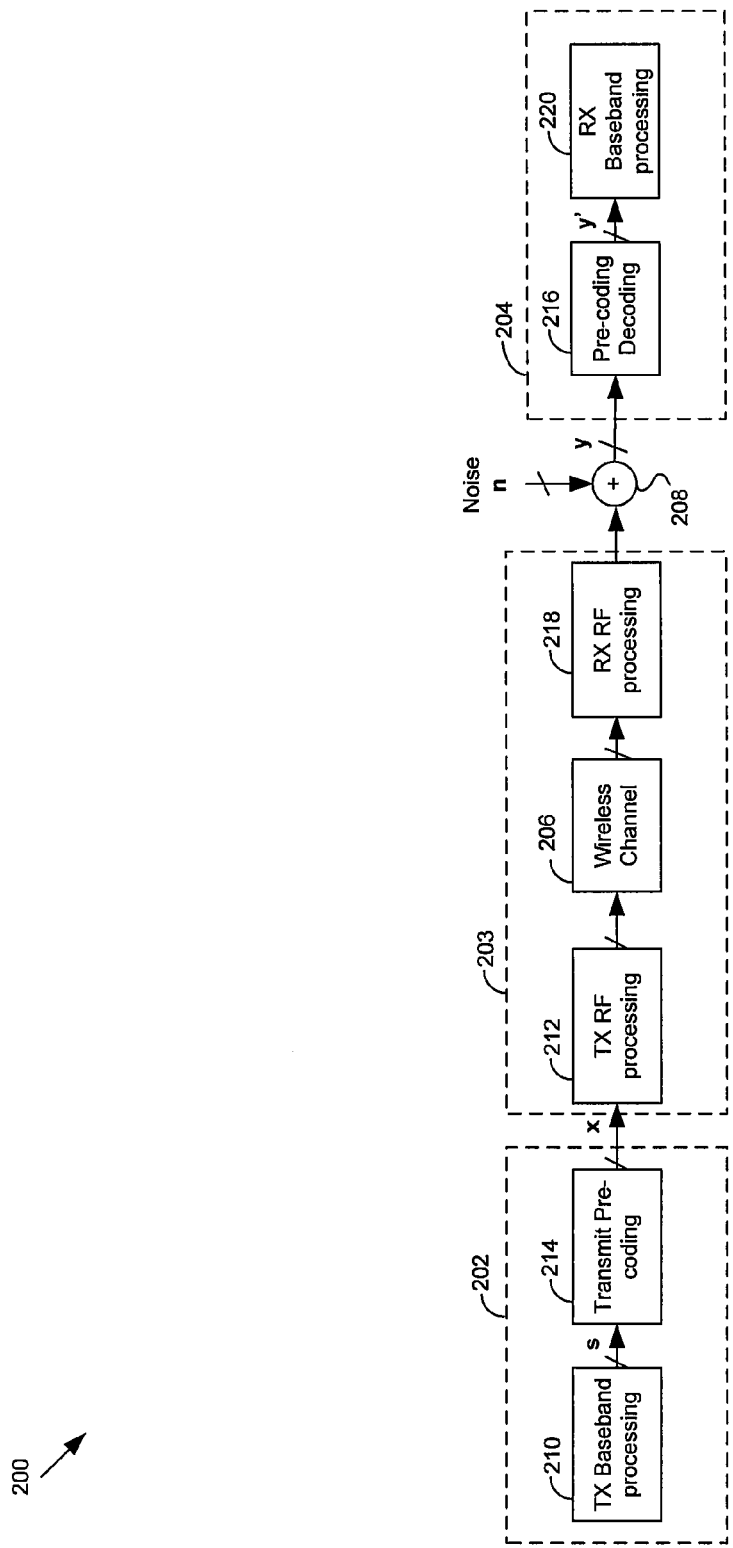
FIG. 2 is a block diagram illustrating an exemplary MIMO transceiver chain model, in accordance with an embodiment of the invention.

FIG. 2 is a block diagram illustrating an exemplary MIMO transceiver chain model, in accordance with an embodiment of the invention. Referring to FIG. 2, there is shown a MIMO system 200 comprising a MIMO transmitter 202, a MIMO baseband equivalent channel 203, a MIMO receiver 204, and an adder 208. The MIMO transmitter 202 may comprise a transmitter (TX) baseband processing block 210 and a transmit pre-coding block 214. The MIMO baseband equivalent channel 203 may comprise a wireless channel 206, a TX radio frequency (RF) processing block 212 and a receiver (RX) RF processing block 218. The MIMO receiver 204 may comprise a pre-coding decoding block 216 and a RX baseband processing block 220. There is also shown symbol vector s, pre-coded vector x, noise vector n, received vector y and channel-decoded vector y'.

The MIMO transmitter 202 may comprise a baseband processing block 210, which may comprise suitable logic, circuitry and/or code that may be enabled to generate a MIMO baseband transmit signal. The MIMO baseband transmit signal may be communicated to a transmit pre-coding block 214. A baseband signal may be suitably coded for transmission over a wireless channel 206 in the transmit pre-coding block 214 that may comprise suitable logic, circuitry and/or code that may enable it to perform these functions. The TX RF processing block 212 may comprise suitable logic, circuitry and/or code that may enable a signal communicated to the TX RF processing block 212 to be modulated to radio frequency (RF) for transmission over the wireless channel 206. The RX RF processing block 218 may comprise suitable logic, circuitry and/or code that may be enabled to perform radio frequency front-end functionality to receive the signal transmitted over the wireless channel 206. The RX RF processing block 218 may comprise suitable logic, circuitry and/or code that may enable the demodulation of its input signals to baseband. The adder 208 may depict the addition of noise to the received signal at the MIMO receiver 204. The MIMO receiver 204 may comprise the pre-coding decoding block 216 that may linearly decode a received signal and communicate it to the RX baseband processing block 220. The RX baseband processing block 220 may comprise suitable logic, circuitry and/or logic that may enable to apply further signal processing to baseband signal.

The MIMO transmitter 202 may comprise a baseband processing block 210, which may comprise suitable logic, circuitry and/or code that may be enabled to generate a MIMO baseband transmit signal. The MIMO baseband transmit signal may be communicated to a transmit pre-coding block 214 and may be the symbol vector s. The symbol vector s may be of dimension $N_{TX}$ by 1.

The transmit pre-coding block 214 may be enabled to apply a linear transformation to the symbol vector s, so that x=Ws, where W may be of dimension $N_{TX}$ by length of s, and $x=[x_1, x_2, \ldots x_{NTX}]^T$. Each element of the pre-coded vector x may be transmitted on a different antenna among $N_{TX}$ available antennas.

The transmitted pre-coded vector x may traverse the MIMO baseband equivalent channel 203. From the $N_{RX}$ receiver antennas, the received signal y may be the signal x transformed by the MIMO baseband equivalent channel 203 represented by a matrix H, plus a noise component given by the noise vector n. As depicted by the adder 208, the received vector y may be given by y=Hx+n=HWs+n. The received vector y may be communicated to the pre-coding decoding block 216, where a linear decoding operation B may be applied to the received vector y to obtain the decoded vector $y'=B^H y=B^H HWs+B^H n$, where B may be a complex matrix of appropriate dimensions. The decoded vector y' may then be communicated to the RX baseband processing block 220 where further signal processing may be applied to the output of the pre-coding decoding block 216.

If the transfer function H of the MIMO baseband equivalent channel 203 that may be applied to the transmitted pre-coded vector x is known both at the MIMO transmitter 202 and the MIMO receiver 204, the channel may be diagonalized by, for example, setting W=V and B=U, where $H=U\Sigma V^H$ may be the singular value decomposition. In these instances, the channel decoded vector y' may be given by the following relationship:

$$y'=U^H U\Sigma V^H Vs+U^H n=\Sigma s+U^H n$$

Since $\Sigma$ may be a diagonal matrix, there may be no interference between the elements of symbol vector s in y' and hence the wireless communications system may appear like a system with up to $N_{TX}$ parallel single antenna wireless communication systems, for each element of s, up to the rank of channel matrix H which may be less or equal to $N_{TX}$. The operation of applying the matrix W to the vector s may be referred to as precoding. The operation of making the wireless system appear like a system of parallel non-interfering data streams due to the use of multiple antennas, may lead to the use of the term spatial data streams since each data stream may originate on different transmit antennas. The number of spatial data streams $1 \leq N_S = r \leq \min\{N_{TX}, N_{RX}\}$ that may be separated or decoupled may be limited by the rank r of the channel matrix H, as described above. Each spatial stream originating at a transmit antenna may be modulated and coded separately.

Figure 3:
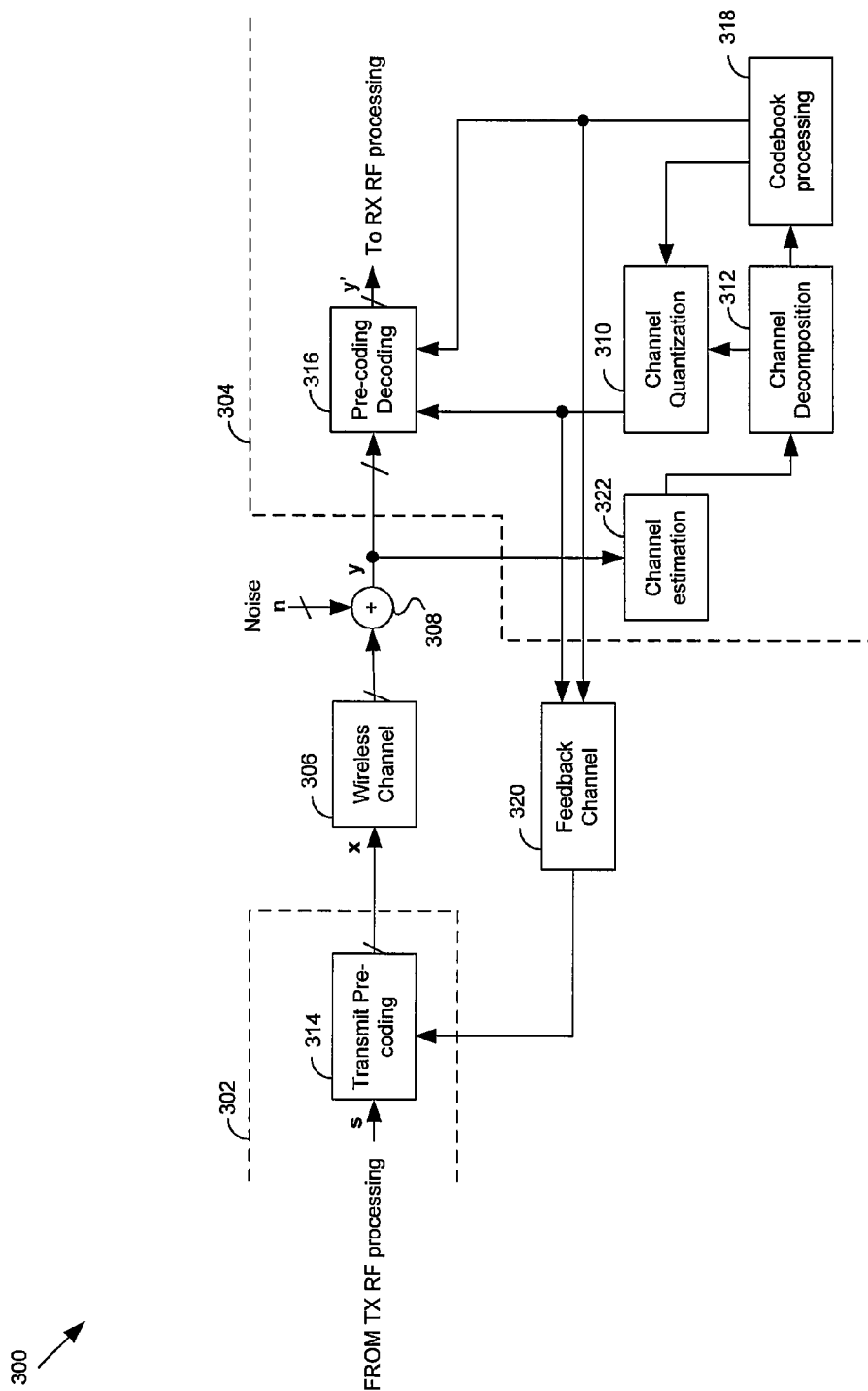
FIG. 3 is a block diagram of an exemplary MIMO with finite rate channel state information feedback, in accordance with an embodiment of the invention.

FIG. 3 is a block diagram of an exemplary MIMO with finite rate channel state information feedback, in accordance with an embodiment of the invention. Referring to FIG. 3, there is shown a MIMO system 300, comprising a partial MIMO transmitter 302, a partial MIMO receiver 304, a Wireless channel 306, an adder 308, and a feedback channel 320. The partial MIMO transmitter 302 may comprise a transmit pre-coding block 314. The partial MIMO receiver 304 may comprise a pre-coding decoding block 316, a channel estimation block 322, a channel quantization block 310, a channel decomposition block 312, and a codebook processing block 318. There is also shown a symbol vector s, a pre-coded vector x, a noise vector n, a received vector y, and a decoded vector y'.

The transmit pre-coding block 314, the wireless channel 306, the adder 308 and the pre-coding decoding block 316 may be substantially similar to the transmit pre-coding block 214, the MIMO baseband equivalent channel 203, the adder 208 and the pre-coding decoding block 216, illustrated in FIG. 2. The channel estimation block 322 may comprise suitable logic, circuitry and/or logic to estimate the transfer function of the wireless channel 206. The channel estimate may be communicated to the channel decomposition block 312, which may comprise suitable logic, circuitry and/or code, which may be enabled to decompose the channel. In this regard, the decomposed channel may be communicated to the channel quantization block 310. The channel quantization block 310 may comprise suitable logic, circuitry and/or code, which may be enabled to partly quantize the channel onto a codebook. The codebook processing block 318 may comprise suitable logic, circuitry and/or logic, which may be enabled to generate a codebook. The feedback channel 320 may represent a channel that may be enabled to carry channel state information from the partial MIMO receiver 304 to the partial MIMO transmitter 302.

In many wireless systems, the channel state information, that is, knowledge of the channel transfer matrix H, may not be available at the transmitter and the receiver. However, in order to utilize a pre-coding system as illustrated in FIG. 2, it may be desirable to have at least partial channel knowledge available at the transmitter. In the exemplary embodiment of the invention disclosed in FIG. 2, the MIMO transmitter 302 may require the unitary matrix V for pre-coding in the transmit pre-coding block 214 of MIMO transmitter 202.

In frequency division duplex (FDD) systems, the frequency band for communications from the base station to the mobile terminal, downlink communications, may be different from the frequency band in the reverse direction, uplink communications. Because of a difference in frequency bands, a channel measurement in the uplink may not generally be useful for the downlink and vice versa. In these instances, the measurements may only be made at the receiver and channel state information (CSI) may be communicated back to the transmitter via feedback. For this reason, the CSI may be fed back to the transmit pre-coding block 314 of the partial MIMO transmitter 302 from the partial MIMO receiver 304 via the feedback channel 320. The transmit pre-coding block 314, the wireless channel 306, and the adder 308 are substantially similar to the corresponding blocks 214, 203 and 208, illustrated in FIG. 2.

At the partial MIMO receiver 304, the received signal y may be used to estimate the channel transfer function H by $\hat{H}$ in the channel estimation block 322. The estimate may further be decomposed into, for example, a diagonal or triangular form, depending on a particular receiver implementation, as explained for FIG. 2. For example, the channel decomposition block 312 may perform an SVD: $\hat{H} = \hat{U} \hat{\Sigma} \hat{V}^H$. In the case of a plurality of antennas, the dimensions of the matrices U, $\Sigma$ and V may grow quickly. In these instances, it may be desirable to quantize the matrix $\hat{V}$ into a matrix Vq of dimensions NTX by NTX, where Vq may be chosen from pre-defined finite set of unitary matrices C={Vi}. The set of unitary matrices C may be referred to as the codebook. By finding a matrix Vq from the codebook that may be, in some sense, closest to the matrix $\hat{V}$, it may suffice to transmit the index q to the transmit pre-coding block 314 via the feedback channel 320 from the channel quantization block 310, if the partial MIMO transmitter 302 may know the codebook C. The codebook C may be varying much slower than the channel transfer function H and it may suffice to periodically update the codebook C in the transmit pre-coding block 314 from the codebook processing block 318 via the feedback channel 320. The codebook C may be chosen to be static or adaptive. Furthermore, the codebook C may also be chosen, adaptively or non-adaptively, from a set of codebooks, which may comprise adaptively and/or statically designed codebooks. In these instances, the partial MIMO receiver 304 may inform the partial MIMO transmitter 302 of the codebook in use at any given instant in time. Hence, the channel H may be estimated in the channel estimation block 322 and decomposed in the channel decomposition block 312.

In the channel quantization block 310, a matrix, for example $\hat{V}$ may be quantized into a matrix $V_q$ and the index q may be fed back to the partial MIMO transmitter 302 via the feedback channel 320. The codebook C may also be chosen time invariant. Furthermore, the codebook C may also be chosen, adaptively or non-adaptively, from a set of codebooks, which may comprise adaptively and/or statically designed codebooks, as described above. Less frequently than the index q, the codebook C from the codebook processing block 318 may be transmitted to the partial MIMO transmitter 302 via the feedback channel 320. To feedback the index q, M bits may suffice when the cardinality |C| of the codebook C may be less or equal to $|C| \leq 2^M$.

The transmit pre-coding block 314 may perform, for example, the linear transformation $x = V_q s$. The pre-coding decoding block 316 at the receiver may implement the linear transformation $y' = \hat{U}^H y$. In some instances, the rank r of the channel matrix H may be less than the number of transmit antennas $r \leq N_{TX}$. In these instances, it may be desirable to map a reduced number of spatial streams into the vector x, as described for FIG. 2. For example, the vector s may be chosen, so that x=Ws, where W may be of dimension $N_{TX}$ by the length of s and the length of s may be the number of spatial streams, generally smaller than the rank r. The matrix W may be constructed, for example, from a desirable choice of columns from $V_q$. In another embodiment of the invention, the vector x may be generated from $x = V_q s$, as described above, and some suitably chosen elements of the vector s of length $N_{TX}$ may be set to zero, so that generally the non-zero elements in the vector s may be less than the rank r. In these instances, the elements in s that may be set to zero may correspond to non-utilized spatial streams. The feedback of the index q, and associated information, may be referred to as Pre-Coding Matrix Index (PMI) information.

In some instances, it may be possible that the different spatial streams may experience significantly different channel conditions. For example, an attenuation coefficient of one spatial stream may be significantly different from an attenuation coefficient of another spatial stream. For example, the Signal-to-Noise Ratio (SNR) or another performance measure may differ between the spatial streams. Accordingly, the modulation and/or coding of each spatial stream may be adapted independently. Adapting the modulation format and the coding rate for each spatial stream (by adapting the transmitted symbols, for example) may be enabled by feeding back channel state information and/or channel-based information from the MIMO receiver 304 to the MIMO transmitter 302 via the feedback channel 320. Feedback information that may be utilized to determine suitable modulation and coding protocols for the transmit data may be referred to as Channel Quality Indicator (CQI) information. In accordance with various embodiments of the invention, the CQI information may be, for example, a Signal-to-Noise-and-Interference Ratio (SINR) that may be mapped to a suitable modulation and coding configuration. In another embodiment of the invention, the MIMO receiver 304 may directly feedback a desirable modulation and coding configuration, based on estimated channel quality, for example.

The modulation and coding for each spatial stream may be chosen from a modulation coding set (MCS), which may comprise combinations of modulation constellations and coding rates that may be employed by the partial MIMO transmitter 302. For example, the modulation may be chosen from, but is not limited to, QPSK, 16QAM or 64QAM, where QPSK may denote quadrature phase shift keying and K-QAM may denote quadrature amplitude modulation with K constellation points. A coding rate may be chosen to be, for example, 1/3, 1/2 or 3/4, whereby any rational number smaller than 1 may be feasible. A modulation coding set may comprise elements that may be formed by combining a modulation type with a coding rate. An exemplary element of a modulation coding set may be 'QPSK ⅓', which may denote a QPSK modulation with a coding rate of ⅓. An MCS may comprise N elements. In this case, the MCS may be referred to as an N-level MCS. In order to select an element from an N-level MCS at the partial MIMO receiver 304 and feed back the index indicating the appropriate element in the MCS from the partial MIMO receiver 304 to the partial MIMO transmitter 302 via the feedback channel 320, $B \geq \log_2(N)$ bits of feedback may be required per spatial stream.

In order to reduce the number of bits required for feedback, a differential scheme may be implemented. In these instances, $B \geq \log_2(N)$ bits may be transmitted for the spatial stream 1, for example, to transmit an index to an element of the MCS, as described above. The parameter $s_k$ may denote an MCS feedback value for spatial stream k. For the spatial streams 2 though $N_S$, an index offset value $s_k$ may be fed back from the partial MIMO receiver 304 to the partial MIMO transmitter 302. Such an offset value may, for example, take the values $s_k \in \{0, \pm 1, \pm 2, \pm 3\}$: $k=2, \ldots, N_S$. In this exemplary case, for spatial stream 2 through $N_S$, $B_d=3$ bits of feedback may be sufficient to feed back an offset value $s_k$: $k \neq 1$. The required index to the MCS for spatial stream k may then be obtained from the feedback value for spatial stream 1 and the offset $s_k$. The index q(k) may denote the index of the desired element in the MCS for user k. Hence, applying the above procedure, the partial MIMO transmitter 302 may determine the indices q(k) according to the following relationship:

$q(j)=s_j$: requiring $B \geq \log 2(N)$ feedback bits $q(k)=q(j)+s_k$: $\forall k \neq j, B_d$ feedback bits required for $s_k$     (1)

where j=1 may be as chosen above. The index j may be chosen to correspond to an arbitrary spatial stream, such that $j \in \{1, 2, \ldots, N_S\}$. For ease of exposition and clarity, j=1 may be assumed in the following description. When $B_d<B$, the number of bits that may be fed back from the partial MIMO receiver 304 to the partial MIMO transmitter 302 may be reduced. In some instances, due to a reduction in the number of feedback bits, the range of indices q(k) that may be addressed by q(k): $k \neq j$ may be limited to a subset of the MCS, since the addressable elements in the MCS and their associated indices q(k) may depend on the value $s_j=s_1$.

A further reduction in the number of feedback bits may be achieved by using a differential scheme also for spatial stream j=1. This may be done in instances where the channel conditions vary slowly enough to enable differential tracking of the new index based on an offset value added to the last instance of the index value. In this case, the index at time n for user k may be defined by the following relationship:

$q_0(j)=s_j$: requiring $B \geq \log 2(N)$ feedback bits $q_n(j)=q_{n-1}(j)+s_j$: $B_d$ feedback bits required     (2)

$q_n(k)=q_n(j)+s_k$: $\forall k \neq j, B_d$ feedback bits required

In this case, hence, the initial index for the spatial stream j=1 may be fed back using B bits, which may address any element in the MCS. For subsequent indices the channel may change slowly enough so that the previous index $q_{n-1}(j)$ may be used to determine the new index $q_n(j)$. It may be desirable to reinitialize $q_n(j)$ occasionally.

It may be desirable to choose an appropriate number of levels for the MCS. In principle, N, the number of elements or levels of an N-level MCS, may be chosen to be any positive integer. However, since the index to an element of an N-level MCS may be fed back from the partial MIMO receiver 304 to the partial MIMO transmitter 302, it may be efficient to choose N as a power of 2. Furthermore, it may be undesirable to use both many and few levels. With few levels, the MCS may be relatively coarse, which may lead to a selection of a level that may be inefficient for the given channel conditions. On the other hand, an MCS with a large number of levels may provide a highly efficient match between the channel conditions and the selected level in the MCS. It may take comparatively long until the system settles, that is, the transient phase, also referred to as settling time, may be long. In addition, with a large number of levels, the differential protocol for the spatial streams 2 through $N_S$ introduced above, may potentially result in a small dynamic range, which may be undesirable.

Figure 4:
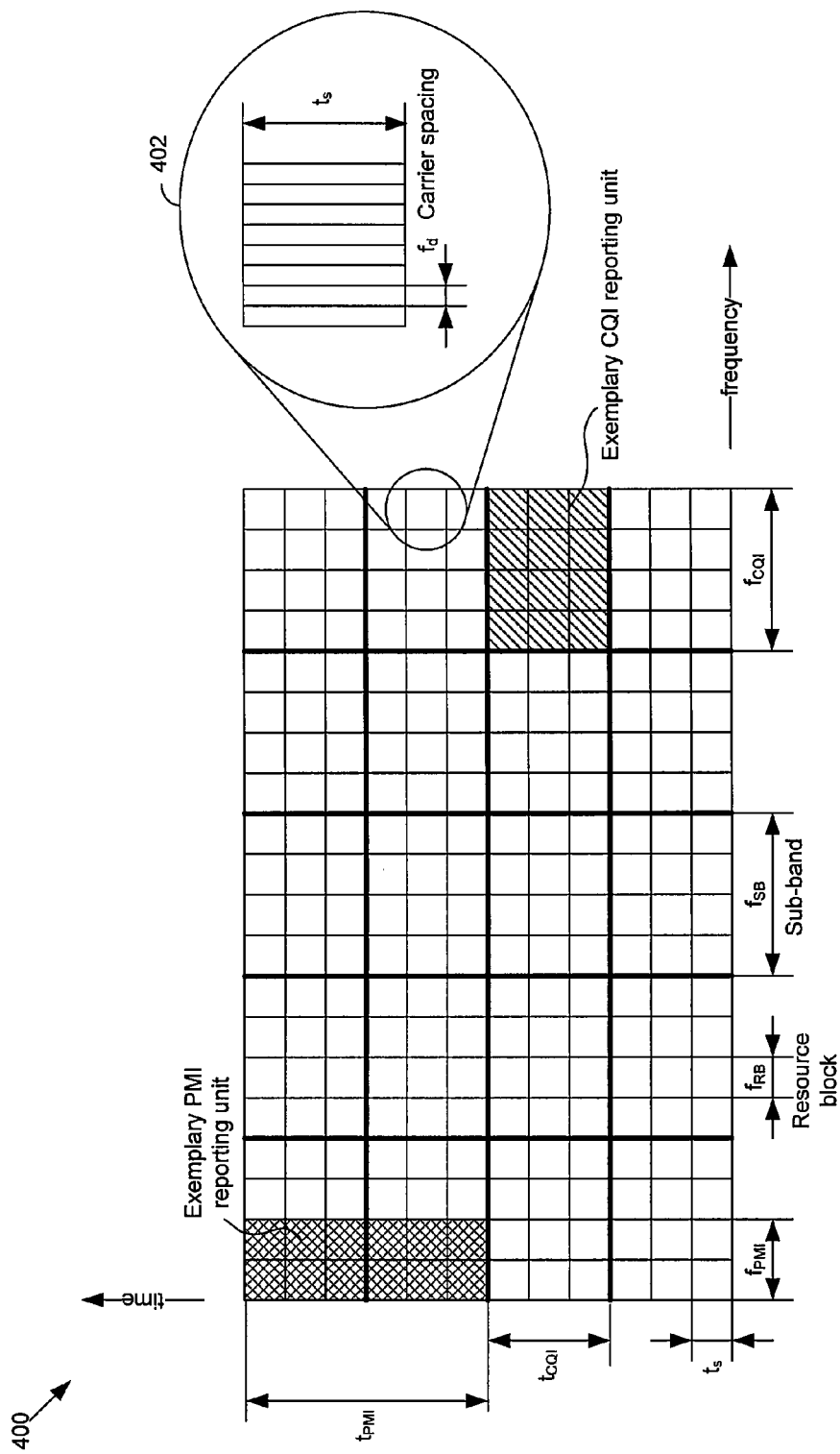
FIG. 4 is a time-frequency diagram illustrating a time-frequency wireless channel, in accordance with an embodiment of the invention.

FIG. 4 is a time-frequency diagram illustrating a time-frequency wireless channel, in accordance with an embodiment of the invention. Referring to FIG. 4, there is shown a time-frequency diagram 400, comprising a detail blow-up 402. The frequency axis may be divided into several subdivisions. A sub-band may be given by a bandwidth $f_{SB}$. A sub-band may comprise, for example, one or more resource blocks of bandwidth $f_{RB}$. A resource block may comprise a bandwidth comprising one or more carrier spacings of bandwidth $f_d$. In an Orthogonal Frequency Division Multiplexing (OFDM) system, for example, the carrier spacing may be given by the bandwidth of a tone and/or between tones. A CQI reporting unit may comprise a bandwidth $f_{CQI}$. A PMI reporting unit may comprise a bandwidth $f_{PMI}$.

The time axis may be sub-divided similarly to the frequency axis. There is shown a $t_{CQI}$, a $t_{PMI}$ and a $t_s$ subdivision. $t_{CQI}$ and $t_{PMI}$ may be reporting intervals between CQI and PMI feedback messages, respectively. The $t_s$ subdivision may be a more fundamental time unit, for example, a channel sampling time. Referring to FIG. 4, there is also shown a CQI time-frequency reporting unit, marked by a hatched pattern, and a PMI reporting unit, marked by a cross-hatched pattern.

In the description of the wireless channel for FIG. 2, the wireless channel for a MIMO system may be described by a channel matrix H. However, the matrix H may represent the channel between transmit and receive antennas by a scalar, as may be see from the channel model describing the matrix H: H=[hij]: $i \in \{1, 2, \ldots N_{RX}\}$, $j \in \{1, 2, \ldots N_{TX}\}$. The wireless channel, in general, may be a function of time and frequency and may be approximately constant only over a small area of the time-frequency plane. This area may be determined by the channel conditions, for example the channel coherence bandwidth and the channel coherence time. These variables may be determined by a variety of environmental factors, for example, Doppler spread due to movements. Hence, the channel matrix may be function of both time and frequency and may be written more accurately as H(f,t)=[hij(f,t)]: $i \in \{1, 2, \ldots N_{RX}\}$, $j \in \{1, 2, \ldots N_{TX}\}$. For notational illustrative purposes, the time and frequency dependency is not shown, however. With regard to FIG. 4, in some instances a matrix H may be measured for each time-frequency slice of area $t_s$ by $f_d$, as illustrated in the detail blow-up 402.

In an OFDM system, such a channel matrix H may correspond to a channel estimate of a single OFDM sub-carrier, also referred to as a tone, in a sampling interval of length $t_s$. Since a channel measurement H may be made for each unit of area $t_s$ by $f_d$ of the wireless time-frequency channel, a large amount of channel data may be available. However, since feedback capacity from the MIMO receiver 304 to the MIMO transmitter 302 via the feedback channel 320 may be limited, it may be necessary to reduce the resolution of the channel feedback messages and report channel measurements that may be a function of a number of channel measurements.

Similarly, in order to reduce the rate at which feedback messages may be sent back to the MIMO transmitter 302, the feedback messages may be sent every multiple of, for example, the sampling time $t_s$. The resolution may be reduced, for example, by averaging the measured channel matrices H in time and frequency over the reporting area in the time-frequency plane, as illustrated for a CQI reporting unit and/or a PMI reporting unit in FIG. 4.

In one exemplary embodiment of the invention illustrated in FIG. 4, a CQI reporting block may comprise a bandwidth of $f_{CQI}$, which may comprise, for example, a plurality of resource blocks of bandwidth $f_{RB}$. As shown in the detail blow-up 402, the Resource block may comprise, for example 8 carrier spacing blocks of bandwidth $f_d$ each. In the time dimension, the CQI reporting unit may comprise a time interval of $t_{CQI}$, which may, for example, comprise 3 sampling periods $t_s$. Hence, as illustrated in FIG. 4, the available bandwidth may be divided into 5 sub-bands and a CQI feedback message may be generated for each sub-band, every period $t_{CQI}$, for example. The CQI reporting unit may comprise a feedback value that may be a function of the channel measurements obtained for the time-frequency slice covered by the CQI reporting unit. For example, an average SINR over the time and frequency slice of the CQI reporting unit may be computed to determine an appropriate average coding and modulation level to be fed back. Hence, to reduce feedback requirements, a plurality of channel measurements H may be processed into one feedback message per PMI/CQI reporting unit. In some instances, a plurality of feedback messages may be desirable. For example, a CQI feedback message may comprise one determined SINR value for one CQI reporting unit.

Similarly, a suitable measure for feedback may be determined for the PMI feedback message. For example, an average matrix H' may be computed from the measured matrices H covered by the time-frequency slide of the PMI reporting unit. In another embodiment of the invention, the measured matrix H for a centrally placed time-frequency slice may be fed back, averaged over time, for example.

The CQI reporting unit and the PMI reporting unit may be arbitrarily sized, in accordance with an embodiment of the invention. In addition, the CQI/PMI reporting unit dimensions may be adjusted dynamically, for example as a function of the available feedback capacity and/or the channel conditions. Similarly, the dimensions of the sub-divisions in time and/or frequency may be chosen arbitrarily. For example, in one embodiment of the invention, a resource block may comprise 12 OFDM tones. The generation of the CQI/PMI messages may not be limited to averages and may be any arbitrary function that may be at least a function of channel conditions and/or channel measurements.

In another embodiment of the invention, the PMI and/or CQI reporting units may be variably sized in time and/or frequency. In other words, a CQI/PMI reporting unit may be of different size, depending on the absolute frequency and the feedback frequency may be dependent on the frequency. For example, an entire channel may be 5 MHz wide. In accordance with an embodiment of the invention, a first CQI/PMI may cover the bandwidth from 0-1 MHz and may feedback a message every x seconds. A second CQI/PMI may cover the bandwidth from 1-4.5 MHz and may feedback a message every 3x seconds. A third CQI/PMI may cover the bandwidth from 4.5-5 MHz and may feedback a message every x/2 seconds. In some instances, neighboring PMI/CQI reporting units may also overlap in time and/or frequency.

Figure 5:
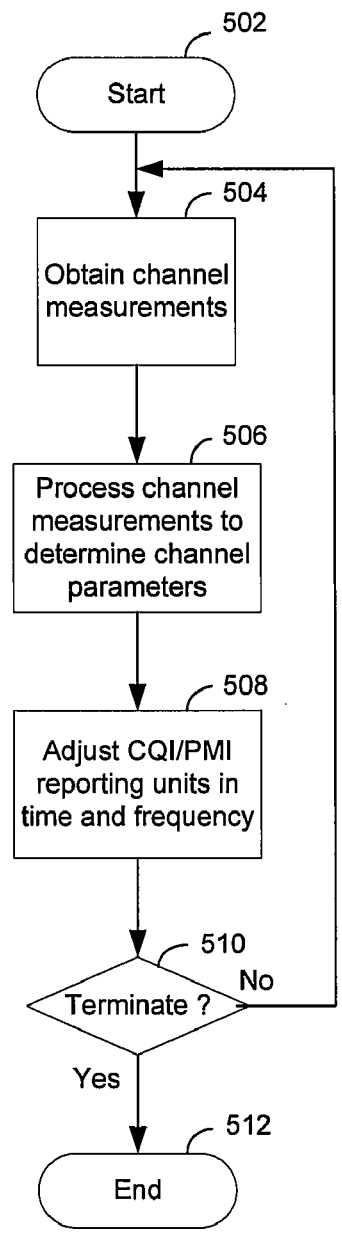
FIG. 5 is a flow chart illustrating an exemplary adjustment of CQI and PMI reporting units, in accordance with an embodiment of the invention

FIG. 5 is a flow chart illustrating exemplary adjustment of CQI and PMI reporting units, in accordance with an embodiment of the invention. As described for FIG. 4, the CQI/PMI reporting units may be adjusted in the time and frequency domain to represent a variable size time-frequency slice of the wireless channel. In addition, the CQI/PMI reporting unit functions that may be used to process channel measurements to generate CQI/PMI feedback messages may be adjustable, in accordance with various embodiments of the invention.

In one embodiment of the invention, the CQI/PMI reporting units may be adjusted dynamically, based on channel conditions, for example, as illustrated in FIG. 5. In step 504, channel measurements may be obtained as a basis for estimating desirable parameters. Channel measurements may be obtained, for example, by transmitting training signals from a MIMO transmitter 302 to a MIMO receiver 304. The training signals may be enabled to permit estimation of the MIMO channel 320, for example, at the MIMO receiver 304. For example, the training signals may possess good autocorrelation properties and may often be chosen orthogonal between different transmit antennas in one or more dimension, for example in the time domain, frequency domain or code domain. In some cases, semi-blind or blind channel estimation may be utilized, whereby no explicit training signals may be required and certain signal characteristics may be exploited to allow channel estimation, for example finite-alphabet, constant modulus and/or cyclo-stationarity of the transmit signals.

In step 506, the channel measurements may be processed to estimate one or more parameters that may be desirable for the adjustment of the CQI/PMI reporting units. Such parameters may be channel characteristics. For example, in the case of macrocells, relevant parameters may comprise the K-factor, delay spread, Doppler spread and/or angular spread of the channel. The K-factor is a factor that may indicate the channel power spread and may be an indicator about the strength of line-of-sight multipath components. A high K-factor may indicate a significant LOS component. The K-factor may typically decrease exponentially with the separation distance between the base station (also referred to as Node B in UMTS) and the mobile terminal (also referred to as User Equipment, UE, in UMTS). The delay spread may be a parameter related to the distribution of received multipath components at the MIMO receiver 304 and may increase with increasing separation distance between the mobile terminal and the base station. In addition, the delay spread may be dependent on the terrain, with hilly terrain generally resulting in higher delay spread. The coherence bandwidth may be derived from the delay spread and may provide an indication about how variable the wireless channel may be in the frequency domain. Hence, delay spread and coherence bandwidth may be parameters that may help to decide the bandwidth of the reporting unit, for example.

Doppler spread may be another desirable parameter. The Doppler spread may be largely invariant with range but may depend on the speed at which the mobile terminal may travel, for example. Doppler spread may be related to coherence time and may hence be a desirable parameter to determine the feedback frequency to accommodate time-variability of the channel. Another desirable parameter may be angular spread, which may indicate the range of directions from which significant signal components may be received. This information may be desirable for beamforming and pre-coding matrix purposes and may help exploit antenna diversity.

Based on some parameters, comprising, for example, the above listed parameters, the CQI/PMI reporting unit may be adjusted in both time and frequency in step 506. In step 510, the adjustment loop may be reinitialized and/or terminated. In some instances, the CQI and the PMI feedback resources may be allocated independently. In another embodiment of the invention, the CQI and PMI feedback resources may be allocated jointly, in view of constraints. For example, in some instances, a maximum number of bits may be available for feedback and it may be determined how to divide available resources between PMI and CQI feedback.

In accordance with an embodiment of the invention, a method and system for adaptive allocation of feedback resources for CQI and transmit pre-coding may comprise assigning a bandwidth and a feedback period to one or more CQI reporting units and a bandwidth and a feedback period to one or more PMI reporting units, as illustrated in FIG. 4. One or more feedback messages may be generated based at least on channel state information associated with the bandwidth and the feedback period assigned to the one or more CQI reporting units and with the bandwidth and the feedback period assigned to the one or more PMI reporting units, as described for FIG. 4.

As described in FIG. 4 and FIG. 5, the bandwidth and the feedback period of the CQI reporting units and/or the PMI reporting units may be adjusted dynamically and/or adaptively. Based on the channel state information, as described for FIG. 5, for example, or as a function of a feedback rate, the bandwidth and/or the feedback period may be assigned. The associated channel state information may comprise channel measurements, for example channel matrix H that may be associated with the assigned bandwidth and the assigned feedback period. Processing the channel state information may be achieved by averaging the channel measurements, for example matrices H or SINRs of OFDM tones as described for FIG. 4, or by an arbitrary function of the channel measurements. The one or more feedback messages for the one or more CQI reporting units may comprise modulation and coding levels or Signal-Noise-and-Interference ratios. The one or more feedback messages for the one or more PMI reporting units may comprise one or more indices into a codebook or one or more matrices.

Another embodiment of the invention may provide a machine-readable storage, having stored thereon, a computer program having at least one code section executable by a machine, thereby causing the machine to perform the steps as described above for a method and system for adaptive allocation of feedback resources for CQI and transmit pre-coding.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing communication signals, the method comprising:
   assigning a bandwidth and a feedback period to one or more CQI reporting units and a bandwidth and a feedback period to one or more PMI reporting units; and
   generating one or more feedback messages based at least on uplink channel state information associated with said bandwidth and said feedback period assigned to said one or more CQI reporting units and with said bandwidth and said feedback period assigned to said one or more PMI reporting units.

2. The method according to claim 1, comprising dynamically adjusting said bandwidth and said feedback period of said CQI reporting units and/or said PMI reporting units.

3. The method according to claim 1, comprising adaptively adjusting said bandwidth and said feedback period of said CQI reporting units and/or said PMI reporting units.

4. The method according to claim 1, comprising assigning said bandwidth and/or said feedback period based on uplink channel state information.

5. The method according to claim 1, comprising assigning said bandwidth and/or said feedback period as a function of a feedback rate.

6. The method according to claim 1, wherein said associated uplink channel state information comprises channel measurements associated with said assigned bandwidth and said assigned feedback period.

7. The method according to claim 6, comprising processing said uplink channel state information by averaging said channel measurements.

8. The method according to claim 6, comprising processing said uplink channel state information by an arbitrary function of said channel measurements.

9. The method according to claim 1, wherein said one or more feedback messages for said one or more CQI reporting units comprise modulation and coding levels.

10. The method according to claim 1, wherein said one or more feedback messages for said one or more CQI reporting units comprise Signal-to-Noise-and-Interference Ratios (SINR).

11. The method according to claim 1, wherein said one or more feedback messages for said one or more PMI reporting units comprise one or more indices into a codebook.

12. The method according to claim 1, wherein said one or more feedback messages for said one or more PMI reporting units comprise one or more matrices.

13. A system for processing communication signals, the system comprising:
   one or more circuits, said one or more circuits enable:
   assignment of a bandwidth and of a feedback period to one or more CQI reporting units and a bandwidth and a feedback period to one or more PMI reporting units; and
   generation of one or more feedback messages based at least on uplink channel state information associated with said bandwidth and said feedback period assigned to said one or more CQI reporting units and with said bandwidth and said feedback period assigned to said one or more PMI reporting units.

14. The system according to claim 13, wherein said one or more circuits dynamically adjust said bandwidth and said feedback period of said CQI reporting units and/or said PMI reporting units.

15. The system according to claim 13, wherein said one or more circuits adaptively adjust said bandwidth and said feedback period of said CQI reporting units and/or said PMI reporting units.

16. The system according to claim 13, wherein said one or more circuits assign said bandwidth and/or said feedback period based on uplink channel state information.

17. The system according to claim 13, wherein said one or more circuits assign said bandwidth and/or said feedback period as a function of a feedback rate.

18. The system according to claim 13, wherein said associated uplink channel state information comprises channel measurements associated with said assigned bandwidth and said assigned feedback period.

19. The system according to claim 18, wherein said one or more circuits process said uplink channel state information by averaging said channel measurements.

20. The system according to claim 18, wherein said one or more circuits process said uplink channel state information by an arbitrary function of said channel measurements.

21. The system according to claim 13, wherein said one or more feedback messages for said one or more CQI reporting units comprise modulation and coding levels.

22. The system according to claim 13, wherein said one or more feedback messages for said one or more CQI reporting units comprise Signal-to-Noise-and-Interference Ratios (SINR).

23. The system according to claim 13, wherein said one or more feedback messages for said one or more PMI reporting units comprise one or more indices into a codebook.

24. The system according to claim 13, wherein said one or more feedback messages for said one or more PMI reporting units comprise one or more matrices.

* * * * *